Sept. 12, 1950 W. T. HILL 2,522,361

TELEPHONE SUPPORTING BASE STAND INDEX CABINET

Filed Aug. 25, 1947 2 Sheets-Sheet 1

INVENTOR
WENDELL T. HILL
BY
ATTORNEYS

Sept. 12, 1950 W. T. HILL 2,522,361

TELEPHONE SUPPORTING BASE STAND INDEX CABINET

Filed Aug. 25, 1947 2 Sheets-Sheet 2

INVENTOR

WENDELL T. HILL

BY

Mason & Graham

ATTORNEYS

Patented Sept. 12, 1950 2,522,361

UNITED STATES PATENT OFFICE 2,522,361

TELEPHONE SUPPORTING BASE STAND INDEX CABINET

Wendell T. Hill, Eagle Rock, Calif.

Application August 25, 1947, Serial No. 770,439

3 Claims. (Cl. 45—.5)

The present invention relates to a telephone stand cabinet, and more particularly to a cabinet adapted for use as a telephone base stand, and having filing and memo holding drawers mounted therein.

Most users of telephones have frequent occasion to make written notes during the course of their conversations, and frequently a need arises for the filing of classified information adjacent the telephone. In response to these well known needs, various types of accessory equipment have been developed for use in conjunction with subscribers' telephone instruments. These accessories include both roll and leaf type indexed arrangements, whereby telephone numbers, sales information, purchasing information and other data may be filed in accordance with alphabetical or numerical designations. Most of these accessories have been in the form of boxes or trays which are adapted to be placed on a desk or telephone stand alongside the telephone. While serving a useful purpose, they frequently do not harmonize with the telephone and its surroundings, and furthermore, are apt to be easily knocked off the support, which frequently is somewhat limited as to size.

An object of the present invention is to make an improved subscriber's telephone instrument base stand with simple memo and filing arrangements incorporated therein.

Another object is to make an improved subscriber's telephone base stand with a recess for receiving a telephone base portion therein, and having memo cards pivotally mounted in the drawers thereof.

Another object is to make an improved subscriber's telephone base stand with a simple and effective mounting for drawers incorporated therein.

Another object is to make an improved telephone base stand with an improved card filing arrangement incorporated therein.

Another object is to make a telephone support stand with improved and simplified drawer slide and card mounting arrangements therein.

These and other objects of the invention will be more fully set forth in the following description and in the accompanying drawings, comprising two sheets.

In the drawings: Fig. 1 is a view in perspective of a telephone base stand embodying the present invention;

Fig. 2 is a front end elevational view of the device shown in Fig. 1, intermediate portions thereof being broken away to permit increasing the scale of the drawing, and a portion of the right hand corner thereof being broken away to show the drawer mounting and drawer slide arrangement, a fragment of a subscriber's telephone instrument mounted on the base being indicated in dotted lines;

Fig. 3 is a plan view of the device shown in Fig. 1, with a central intermediate portion broken away to permit increasing the scale of the drawing, the left hand side portion of the cabinet and upper drawers being broken away to the depth of a lower memo holding drawer, while the right hand portion is broken away to the depth of an upper or filing card drawer, portions of the side of a drawer slide support also being broken away to show drawer mounting details;

Figures 1, 2, 4:
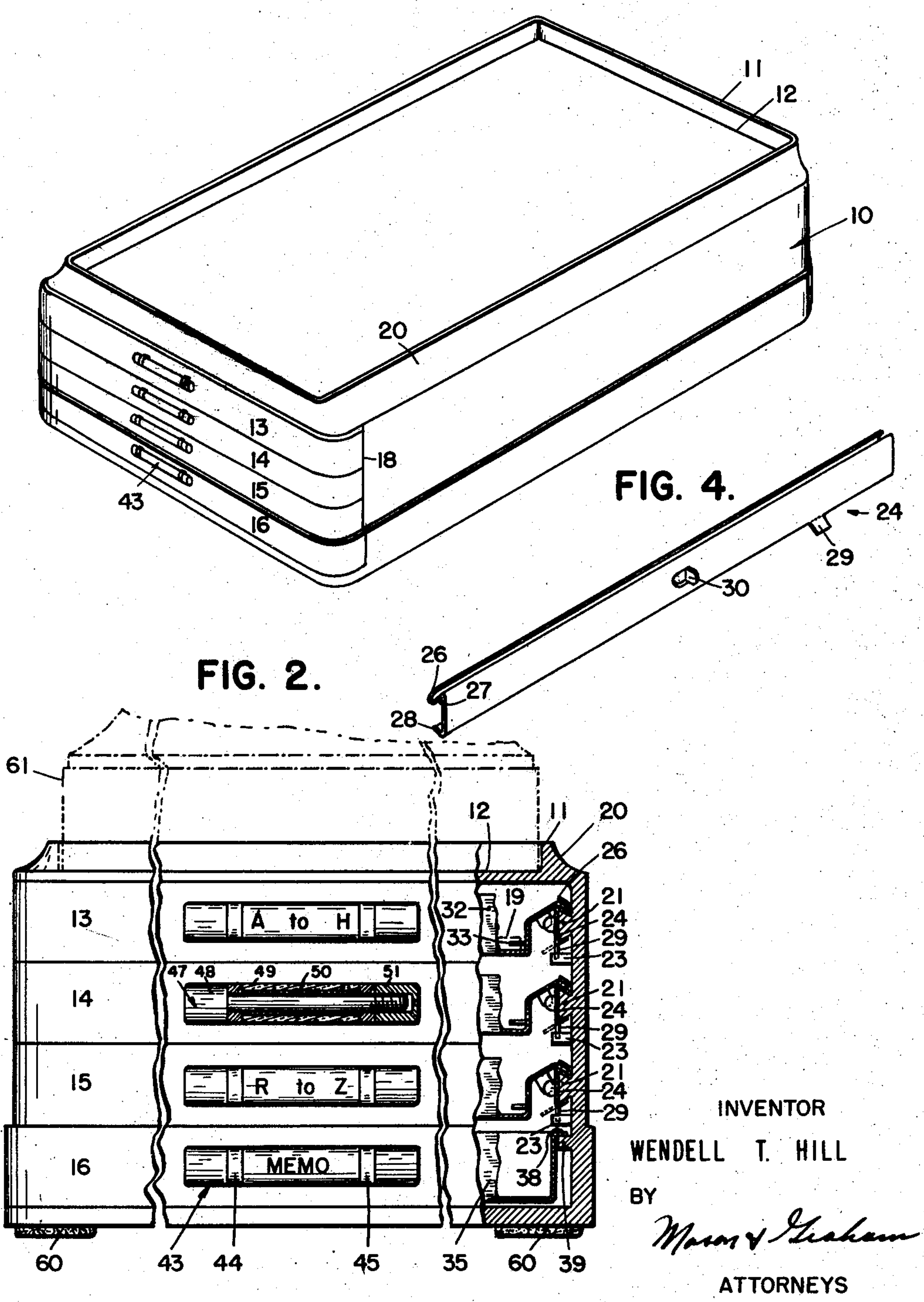
Fig. 4 is a view in perspective of a sheet metal drawer extension slide.

Referring to the drawings in detail, a base cabinet 10 is molded, preferably in one piece, from suitable plastic molding material. This may either be thermosetting or thermoplastic material of any of a number of well known types available for this type of molding operation.

The cabinet has a top 11, which is formed with an upper recess 12 therein adapted to receive the base of the largest standard size subscriber's telephone instrument in common use. This recess preferably is of a depth to conceal the supporting feet or pads with which such instruments are provided. An ornamental cove 20 is provided around the top of the cabinet which produces a harmonious blending of the lines of the cabinet with the telephone instrument. The base of a type of telephone instrument in common use is approximately five and one-eighths inches in width and seven and one-half inches in length. Allowing approximately one-eighth inch for clearance gives a preferred inside measurement for the upper recess of five and one-fourth inches and seven and five-eighths inches.

In the present arrangement, for drawers 13, 14, 15 and 16 are adapted to be inserted slidably in the open front end of the cabinet 10.

The opening in the front end of the cabinet extends back as at 18 from a point below the moulding 20 which surrounds the upper telephone instrument receiving recess. The three upper drawers 13, 14 and 15 are intended to receive index cards, and the lower drawer 16 is intended to receive a quantity of memo cards or a pad of paper which may be employed for jotting down memos and the like. It is necessary in using the upper three drawers that they be capable of being withdrawn fully from the cabinet, while at the same time remaining attached thereto, so that index cards 19, which are pivotally mounted on individual pairs of supports in each of the upper three drawers, may be swung upwardly about their pivots to permit exposing the data on any desired card. For this reason the upper drawers are mounted on tracks which are extensible, from a closed position wholly concealed within the cabinet, to an extended position which will expose the entire drawer while still maintaining it in supported position on the cabinet.

The drawer supports for each of the upper three drawers comprise a pair of dovetailed or diagonally undercut ribs 21 and 22, extending inwardly from opposite walls of the cabinet laterally opposite the position occupied by each of the upper three drawers. A stop stud 23 also is provided to extend inwardly from the wall of the cabinet in downwardly spaced relation from each of the ribs, and inwardly a short distance from the outer ends thereof.

A channel drawer slide 24 having side flanges 27 and 28 thereof bent inwardly to correspond with the slope of the sides of the ribs 21 is slidably mounted on each of the ribs. The lower flange of each of these channel slide members has a double slit therein to free a tab 29 (see Figs. 2 and 4) which is bent downwardly from the material of the lower flange to the dotted line position illustrated in Fig. 2. With the tab bent to the dotted line position of Fig. 2, it will clear the stop stud 23 and permit the slide to be moved slidably inward on the rib 21. After the slide has been moved inwardly sufficiently for the tab to clear the stud 23, the tab is bent downwardly to the solid line position illustrated in Figs. 2 and 4. It then will engage the stop stud 23 when pulled outwardly and thus will prevent the slide 24 from being withdrawn fully from its associated undercut rib. The upper side flange 27 of each slide member has a reversely bent marginal portion 26 adapted to form a channel within which to receive a drawer side flange, in a manner to be described later herein.

Figure 3:
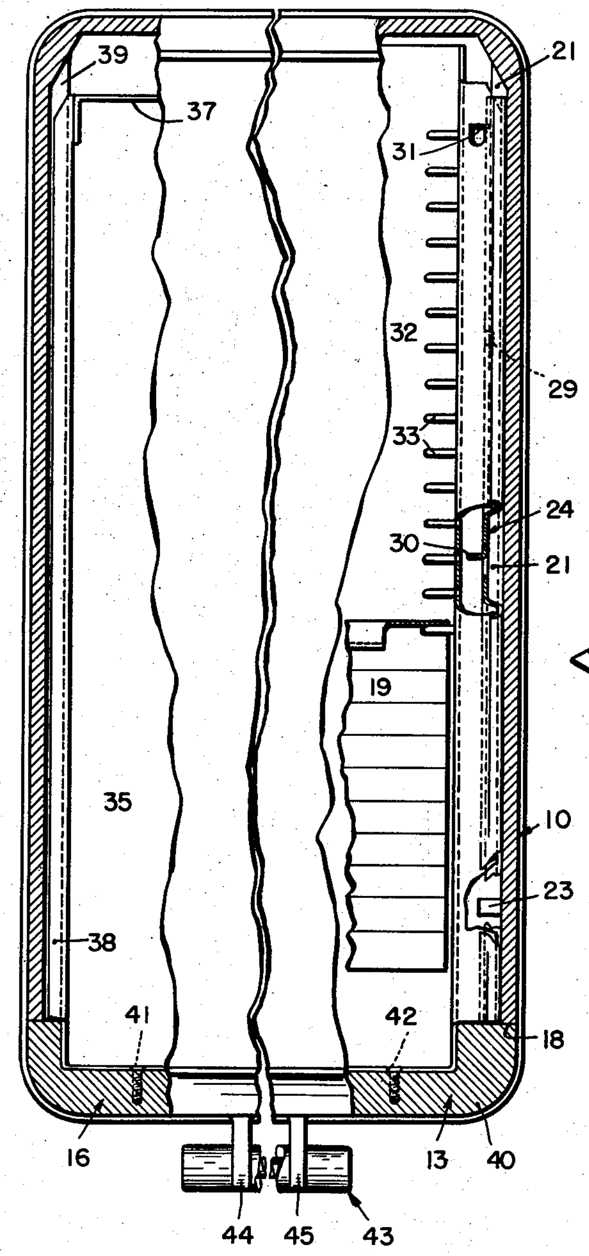

A secondary stop tab 30 is cut from the material of the side of each of the slide channels 24. These tabs are bent outwardly at right angles from the channel slides, as illustrated in Figs. 2, 3 and 4, to engage drawer stop tabs 31 similarly formed and bent downwardly at right angles from the sheet metal sides of each of the three top drawers.

Figure 5:
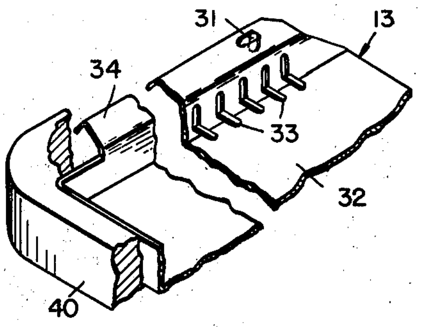
Fig. 5 is a fragmentary view in perspective, showing a side portion of a filing drawer, an intermediate portion thereof being broken away to permit increasing the scale of the drawing.

The three upper, or filing drawers, 13, 14 and 15, are similar to each other. Each comprises a sheet metal pan 32 open at its rear end and having a plurality of narrow tabs 33 cut from the sheet metal of its sides and attached thereto at their lower ends. These tabs are bent inwardly at right angles to the side wall of the drawer pan, as illustrated in Figs. 2, 3 and 5.

The upper marginal edge portions of the side walls of each of the upper drawer pans are bent outwardly as at 34, the extreme outer marginal portions thereof being slidably inserted in the reversely bent flanged portions 26 of the channeled drawer slides. This drawer mounting arrangement prevents the drawer from tilting downwardly when both the slides 24 and the drawer supported thereon are pulled fully forwardly against the stops.

The lowermost drawer 16 preferably comprises simply an open pan 35 adapted to hold a memo pad or memo cards, and is provided with a back wall 37 which may be secured in place as by a spot welding. The lower drawer is slightly wider than the three upper filing drawers, as best illustrated in Figs. 2 and 3. The side walls of this lower drawer have outwardly bent upper flange portions 38 which ride on a bead 39 moulded integrally with the cabinet casing 10. No stop is provided to prevent this drawer from being completely withdrawn from the cabinet, since such withdrawal is desirable in its intended use.

A drawer front facing block 40, which may be of moulded plastic material, preferably of a color and type to match or harmonize with the body portion 10 of the cabinet, is molded to fit over the forward end of each of the drawers, as illustrated in Figs. 1, 2, 3 and 5. Two screws 41 and 42 (see Fig. 3) are inserted in openings provided in the front wall of the drawer and are screwed into holes in the inner side of the drawer front facings.

A drawer pull 43 is provided on each drawer. Each drawer pull is supported by a pair of supports 44 and 45 which may be moulded integrally with the drawer front facing blocks 40. A bolt 47 having a painted or plated head 48 is inserted through aligned holes in the supports 44 and 45 and through a transparent tube 49 which may be of plastic tubing. The tubing has an inner diameter slightly greater than that of the shank of the bolt to receive a data card 50 between the tube and the bolt. The card is imprinted with suitable indica such as the index letters or the word "memo," as illustrated in Fig. 2. The data card 50 is inserted in the tube, so as to be supported by the bolt in visible position, against the inner wall of the tubing, as illustrated in Fig. 2.

A cap nut 51, which preferably is painted or plated to match the bolt head, is threaded onto the other end of the bolt, as shown in Fig. 2, to complete a decorative, sturdy and useful drawer pull.

Figure 6:
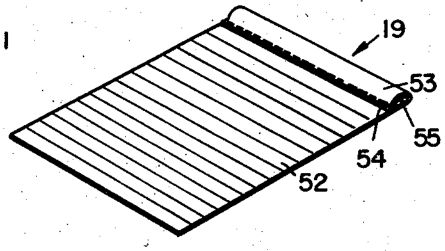
Fig. 6 is a view in perspective of one form of index card for use in the device.
Figure 7:
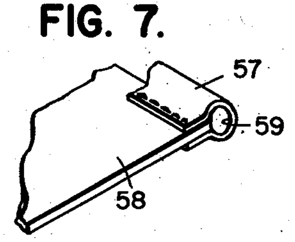
Fig. 7 is a fragmentary view in perspective showing a corner portion of a modified form of index card.

Memorandum or index cards for mounting the upper drawers are illustrated in Figs. 6 and 7. In the type illustrated in Fig. 6, a card 52 has its upper edge portion 53 reversely folded upon itself and secured, as by stitching 54, to form a transverse channel 55, the ends of which are adapted to receive the tabs 33 extending inwardly from the side walls of the three upper filing drawers. Each oppositely disposed pair of these tabs is provided with one of the index cards, which is mounted on the tabs by first inserting a tab on one side of the drawer into one end of the channel 55, and then, by slightly bending the card to shorten its transverse dimension, by inserting the opposite tab on the other side of the drawer into the other end of the channel. The natural resilience of the card returns it to its original flat form when released, and causes the tabs to enter the channel for pivotal mounting of the card. The cards position themselves in mutually overlapping relation, as shown in Fig. 3. By raising any of the cards upwardly from its normal position, the cards rearwardly thereof also will be raised simultaneously therewith to expose the data on top of the card immediately beneath the one raised, and on the under side of the one which is thus raised.

The same mounting arrangement is provided with the card illustrated in Fig. 7, which has a folded fabric strip 57 secured over the upper edge of a card 58 with sufficient clearance from the end of the card to provide a transverse channel 59 similar to that provided in the structure illustrated in Fig. 6.

The cabinet 10 is adapted to be mounted on any suitable supporting surface, such as a table, and is provided with cushioned feet 60 which may be of felt or other suitable material, glued or otherwise secured to the bottom of the cabinet. A telephone instrument 61 is mounted in the upper recess 12, which preferably is deep enough to conceal the feet of the instrument. This arrangement gives the appearance of an integrated structure, which is pleasing and effective.

In opening any of the filing drawers by drawing forward on a drawer pull, usually the channeled slides 24 will slide forward the full limit of their movement as determined by the stop stud 23 and the downwardly extending tab 29 before any relative slidable movement of the drawer flange 34 occurs on the channeled slides 24. When the channeled slide members 24 are arrested from further forward movement, however, the drawer is free to move slidably forward on the slides 24 until the downwardly bent tabs 31 of the drawer flange 34 engage the stop tabs 30 on the slides. When this occurs the entire drawer pan will be forwardly of the cabinet and will be supported against forward tilting motion by engagement of the drawer flanges 34 in the reversely bent portions 26 of the drawer slides.

The weight of the cabinet 10 plus that of the remaining drawers, together with the considerable weight of the telephone instrument itself, makes a sturdy and stable support for the drawers when consulting the various indexes.

When it is desired to use the lower drawer, as for making memos, either the entire drawer may be removed and placed on a desk or table for ease in writing on the sheets or cards contained therein, or if desired, the drawer may be opened slightly and one or more of the sheets or cards, as required, may be withdrawn therefrom.

While I have illustrated and described a preferred form of my invention, it will be apparent to those familiar with the art that the device is capable of several modifications without departing from the spirit of my invention. It is desired, therefore, not to limit the invention except as set forth in the following claims.

I claim:

1. A telephone supporting base stand index device comprising in combination a cabinet having a base, side, and rear walls, and a top, the top having a recess in the upper side thereof adapted closely to receive the base of a subscriber's telephone instrument, a plurality of undercut drawer supporting ribs disposed in laterally opposite pairs interiorly on the sides of said cabinet, a sheet metal channeled drawer slide member slidably mounted on each of said ribs, each of said slide members having a reversely bent marginal flange spaced from a side of the channeled member to form therewith an inwardly facing channel, and a plurality of index card holding drawers, each of said drawers having an outwardly turned flange on each side thereof adapted slidably to enter said inwardly opening channels to support said drawers thereon.

2. A telephone supporting base stand index device comprising in combination a cabinet having a base, side, and rear walls, and a top, the top having a recess in the upper side thereof adapted closely to receive the base of a subscriber's telephone instrument, a plurality of undercut drawer supporting ribs disposed in laterally opposite pairs interiorly on the sides of said cabinet, a sheet metal channeled drawer slide member having inwardly bent sides to conform to the sides of said ribs, one of said slides being mounted slidably on each of said ribs, each of said slide members having a reversely bent marginal flange spaced from a side of the channeled member to form therewith an inwardly facing channel, stop means mounted to limit the outward movement of said drawers, and a plurality of index card holding drawers, each of said drawers having an outwardly turned flange on each side thereof adapted slidably to enter said inwardly opening channels to support said drawers thereon.

3. A telephone supporting base stand index device comprising in combination a cabinet having a base, side, and rear walls, and a top, the top having a recess in the upper side thereof adapted closely to receive the base of a subscriber's telephone instrument, a plurality of undercut drawer supporting ribs disposed in laterally opposite pairs interiorly on the sides of said cabinet, a stop stud mounted on the cabinet wall and projecting inwardly in vertically spaced but adjacent relation to at least one rib of each of said pairs thereof, a sheet metal channeled drawer slide member slidably mounted to fit over each of said ribs, each of said slide members having a reversely bent marginal flange spaced from a side of the channeled member to form therewith an inwardly facing channel, a plurality of index card holding drawers, each of said drawers having an outwardly turned flange on each side thereof adapted slidably to enter said inwardly opening channels to support said drawers thereon, a bendable tab cut from each of said drawer slides which are adapted to fit over a rib having a stop stud adjacent thereto, said bendable tab being initially bent to clear its adjacent stop stud, and being bendable after insertion of the slide over said rib to engage said stud to prevent withdrawal of said slide, and a pair of stop tabs mounted one on said drawer and one on at least one of each of said pairs of slides, said stop tabs being in lineal alignment with the stop tab on the drawer mounted in the inwardly opening channel in its associated slide to limit the outward movement of the drawer on the slide.

WENDELL T. HILL.

REFERENCES CITED

The following references are of record in the file of this patent:

UNITED STATES PATENTS

| Number | Name | Date |
|---|---|---|
| 2,025,765 | McQueen | Dec. 31, 1935 |
| 2,238,004 | Wolters | Apr. 8, 1941 |
| 2,265,927 | Pratt | Dec. 9, 1941 |
| 2,282,247 | Reid | May 5, 1942 |
| 2,283,690 | Munson | May 19, 1942 |

FOREIGN PATENTS

| Number | Country | Date |
|---|---|---|
| 1,972 | Great Britain | 1901 |
| 186,511 | Switzerland | Sept. 30, 1936 |